United States Patent
Morimoto et al.

(10) Patent No.: US 7,243,601 B2
(45) Date of Patent: Jul. 17, 2007

(54) PRINTING PLATE, PRESS AND METHOD OF PRINTING, AND APPARATUS AND METHOD FOR MANUFACTURING LIQUID CRYSTAL DEVICES

(75) Inventors: Mitsuaki Morimoto, Matsusaka (JP); Makoto Nakahara, Nara (JP); Naoto Yokoyama, Matsusaka (JP); Shinichiro Kawabe, Adachi-ku (JP); Masaru Mitsumoto, Adachi-ku (JP); Yuichi Komura, Higashiosaka (JP); Yoshimi Saito, Higashiosaka (JP)

(73) Assignees: Sharp Kabushiki Kaisha, Osaka (JP); Hitachi Plant Technologies, Ltd., Tokyo (JP); Komura Tech Co., Ltd., Osaka (JP)

( * ) Notice: Subject to any disclaimer, the term of this patent is extended or adjusted under 35 U.S.C. 154(b) by 0 days.

(21) Appl. No.: 10/517,242

(22) PCT Filed: Jun. 16, 2003

(86) PCT No.: PCT/JP03/07626
§ 371 (c)(1), (2), (4) Date: Dec. 7, 2004

(87) PCT Pub. No.: WO2004/007209
PCT Pub. Date: Jan. 22, 2004

(65) Prior Publication Data
US 2005/0199145 A1    Sep. 15, 2005

(30) Foreign Application Priority Data
Jul. 10, 2002  (JP) .............................. 2002-201061

(51) Int. Cl.
*B41B 1/02*    (2006.01)
*B41N 1/20*   (2006.01)

(52) U.S. Cl. ...................................... 101/401; 101/386
(58) Field of Classification Search ................ 101/401, 101/386, 384, 395
See application file for complete search history.

(56) References Cited

U.S. PATENT DOCUMENTS

| 1,442,338 | A | * | 1/1923 | Herr ......................... 101/401.2 |
| 2,087,462 | A | * | 7/1937 | Zimmer ..................... 101/384 |
| 3,216,353 | A | * | 11/1965 | Wallenius ................... 101/395 |
| 2002/0073856 | A1 | * | 6/2002 | Davis et al. .................. 101/35 |
| 2004/0126682 | A1 | * | 7/2004 | Dreher et al. ................. 430/11 |
| 2005/0150407 | A1 | * | 7/2005 | Kuczynski et al. ...... 101/401.1 |

FOREIGN PATENT DOCUMENTS

| JP | 62-059093 | 3/1987 |
| JP | 03-251499 | 11/1991 |

(Continued)

*Primary Examiner*—Daniel J. Colilla
*Assistant Examiner*—Marissa Ferguson-Samreth
(74) *Attorney, Agent, or Firm*—David G. Conlin; Steven M. Jensen; Edwards Angell Palmer & Dodge LLP

(57) ABSTRACT

A printing plate includes, on the printing surface of a raised part, grooves passing through from one side to another thereof. Preferably, the grooves are parallel to each other and equally spaced apart. More preferably the raised part is in the shape of a nearly-rectangular frame, and the grooves are provided such that one side of the near-rectangle and the longitudinal direction of the grooves form an angle of 45°.

15 Claims, 11 Drawing Sheets

FOREIGN PATENT DOCUMENTS

| | | |
|---|---|---|
| JP | 05-015818 | 1/1993 |
| JP | 09-258194 | 10/1997 |
| JP | 10-217418 | 8/1998 |
| JP | 11-183918 | 7/1999 |
| JP | 2000-206543 * | 7/2000 |
| JP | 2001-171066 | 6/2001 |
| JP | 2002-187338 | 7/2002 |
| JP | 2003-029271 | 1/2003 |

* cited by examiner

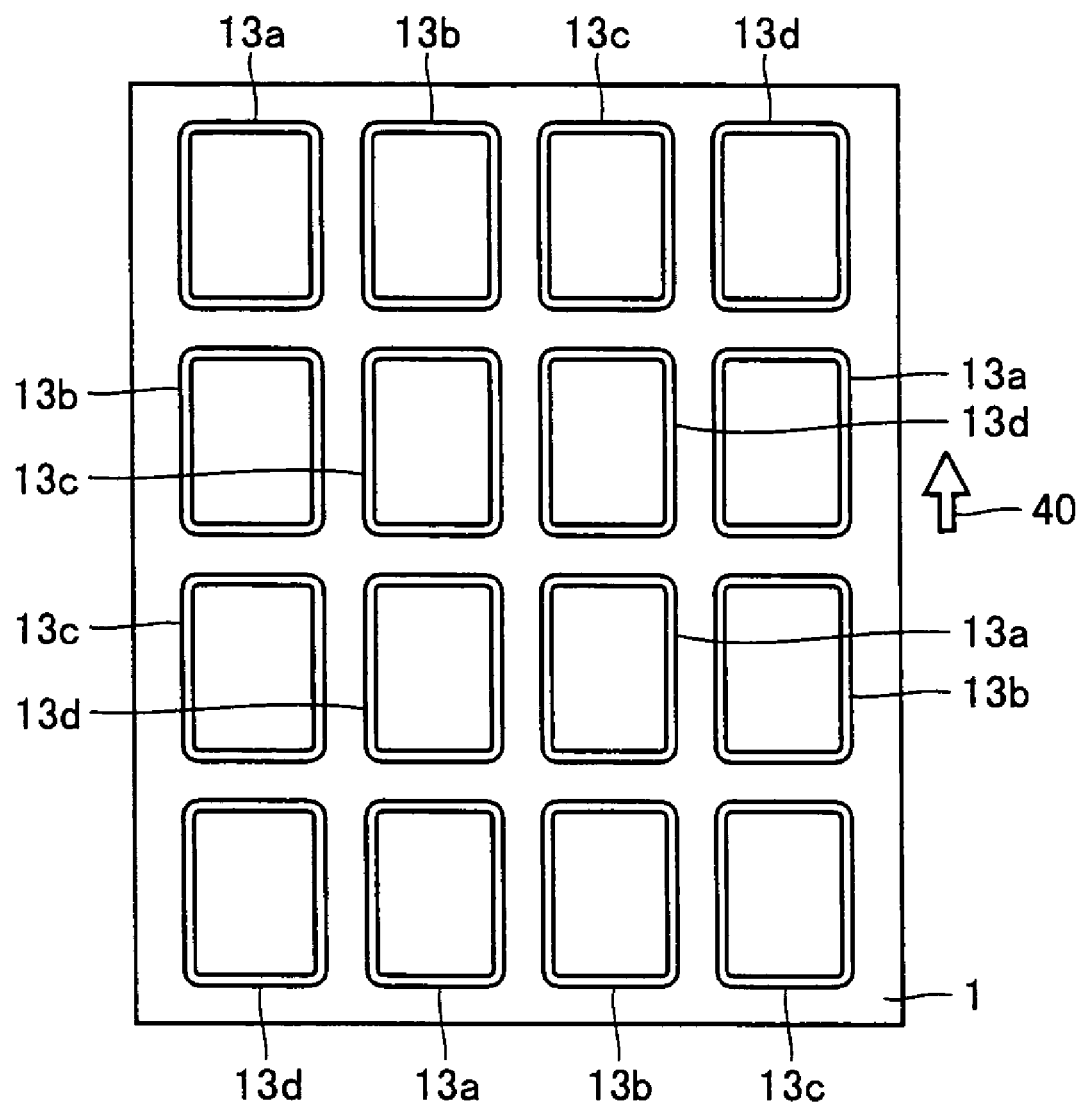

PRINTING PLATE, PRESS AND METHOD OF PRINTING, AND APPARATUS AND METHOD FOR MANUFACTURING LIQUID CRYSTAL DEVICES

TECHNICAL FIELD

The present invention relates to a printing plate and a press, and more particularly to a flexographic plate and a method for flexography that allows printing substance with a more thickness to be transferred to a printing substrate. The present invention further relates to an apparatus and method for manufacturing liquid crystal devices, and more particularly to an apparatus and method for printing sealing material that bonds the panel substrates together.

BACKGROUND ART

Flexography is a type of relief printing that uses a flexographic plate of flexible rubber or resin, and a liquid printing substance. Currently, printing substrates (which is understood as any object on which printing is performed) that can be used for printing with this method include paper as well as cellophane and aluminum foil, and the like.

FIG. 10 illustrates a printing unit that constitutes a key component of a flexographic press. The printing unit includes an impression table 11 that supports a printing substrate 10, a printing plate 1 having a raised part 2, a plate cylinder 12, an anilox roll 16, a dispenser 18, and a doctor roll 15. Printing substance 17 such as ink is supplied to anilox roll 16 using dispenser 18. Anilox roll 16 and plate cylinder 12 are in the shape of cylindrical rolls that contact each other and are rotated in the directions indicated by arrows 48 and 46, respectively. Plate cylinder 12 includes on its perimeter surface printing plate 1 that has raised part 2 in a configuration that corresponds to the design to be printed. Raised part 2 and printing substrate 10 are disposed to be in contact with each other. Printing substance 17 is applied to raised part 2 by anilox roll 16 and then transferred to printing substrate 10. Printing substrate 10 is disposed on a main surface of impression table 11 and is moved in the direction indicated by arrow 47 as printing proceeds. The transferred design is defined by the top surface configuration of raised part 2. The substance that has been printed onto printing substrate 10 and has the configuration of raised part 2 is hereinafter referred to as a "printed substance". In the present example, the printed substance 4 is in the shape of a frame.

The curved perimeter surface of anilox roll 16 is contacted by raised part 2 as well as doctor roll 15. Doctor roll 15 serves to uniformly spread printing substance 17 supplied by dispenser 18 over the perimeter surface of anilox roll 16. Thus, doctor roll 15 is disposed in contact with anilox roll 16 between the location where printing substance 17 is supplied and the location where it is in contact with raised part 2.

Alternatively, a plate-like doctor blade may be used that replaces, and functions similarly to, doctor roll 15. Further, a flexographic press may include a cylindrical fountain roll that replaces, and functions similarly to, dispenser 18 to supply printing substance 17 to anilox roll 16.

Conventionally, flexography has been used for printing characters and graphics onto packaging papers. However, as it may be employed in forming thin films, it is also used for other purposes than printing characters and graphics. For example, flexography may be used for forming alignment layers for a liquid crystal display, with a glass being the printing substrate and a polyimide thin film being printed on its surface.

Flat panel displays using e.g. a liquid crystal panel are employed in a variety of devices such as mobile phones, personal digital assistants, televisions and the like. The liquid crystal panel thereof has liquid crystal that is sealed between a pair of panel substrates spaced apart at a predetermined distance. A thermosetting or UV curing seal is used to bond the liquid crystal panels together along their periphery and to prevent the liquid crystal from leaking.

In recent years, a method of manufacturing liquid crystal panels called the dropping and panel-alignment method, or the dropping and filling method, has gained in popularity. The method preforms a frame-shaped seal on one of a pair of panel substrates and then drops a predetermined amount of liquid crystal within the frame. The panel substrate is then bonded together with the other panel substrate under a depressed atmosphere before retrieving them to the ambient atmosphere to produce a liquid crystal panel. The method allows the filling of liquid crystal and the bonding together of the two panel substrates simultaneously without leaving bubbles in the liquid crystal.

Conventional methods of forming a seal for the liquid crystal panel include the screen-printing method, the dispensing method and the like. In the screen printing, a screen mesh comes in contact with the surface of a printing substrate including a panel substrate and may scratch an alignment layer on the panel substrate, resulting in a decreased displaying quality. To prevent this, as disclosed in Japanese Patent Laying-Open No. 9-258194, methods have been proposed to separate the screen mesh from the printing substrate by inserting a spacer therebetween. This, however, requires emulsion to be thinly spread on the alignment layer, which may easily be punctuated, often causing the sealing material to be printed on the alignment layer. The dispensing method (see Japanese Patent Laying-Open No. 5-15818) uses a dispensing nozzle to print unicursally a frame using sealing material for each cell, which takes a long time. For example, it is inefficient when printing hundreds of small frames of sealing material on one panel substrate.

Consequently, methods have been developed for forming a seal without scratching the surface of the printing substrate while using flexography with improved productivity.

For a small film thickness of a seal in the dropping and panel-alignment method, when two opposed panel substrates are bonded together, part of the liquid may leak through a gap between the seal and the panel substrate prior to the entire periphery of the seal being in contact with the panel substrate to seal the liquid therein. Air may also enter the liquid crystal panel through a gap between the seal and the panel substrate upon retrieving the panel substrates from the depressed atmosphere to the ambient atmosphere. Accordingly, the pre-printed seal should have a thickness equal to or greater than 20 μm, and preferably a thickness in the range from 25 to 30 μms.

Flexography is suitable for producing a thin film of 0.01–1 μm. For a film thickness greater than several micrometers, attempts have been made to increase the amount of substance transferred from the anilox roll to the raised part of the printing plate by providing dot-like dimples on the raised part of the printing plate, as disclosed in Japanese Patent Laying-Open No. 10-217418. However, conventional flexography can stably produce a film thickness of around 10 μm, at most. The thickness of printing substance transferred to the printing substrate is hereinafter referred to as the "film thickness". Trying to produce a greater film thickness requires correspondingly larger dot-like dimples on the raised part of the flexographic printing plate. However, printing substance is often insufficiently supplied from the anilox roll into the dot-like dimples, which leaves bubbles, resulting in bubbles in the printed substance after printing or in printed lines being partially narrower (a narrower portion of the printed line is hereinafter referred to as the "narrowness").

The present invention solves the above-mentioned problems. An object of the present invention is to provide a relief printing plate and method of printing using the same, and an apparatus and method for manufacturing liquid crystal devices that allow printing for producing a film thickness greater than would be achieved by the conventional art without causing bubbles or narrownesses.

DISCLOSURE OF THE INVENTION

A printing plate according to the present invention includes a raised part for transferring printing substance to a printing substrate and, on a printing surface of the raised part, a groove passing through from one side to another thereof. In other words, a relief printing plate has, on a printing surface of a raised part in the design to be printed, a groove passing through from one side to another thereof. By employing this configuration, the raised part only needs to have a groove on its printing surface to transfer, onto the printing substrate, more printing substance held on the printing plate than would be the case using the conventional art. Thus, printing can be performed to produce a film thickness greater than using the conventional art. The "printing surface" means a surface of the raised part that holds printing substance and provides the transfer by contacting the printing substrate.

Preferably, in the invention stated above, the groove has a cross section generally in the shape of a triangle. In other words, the groove is not in the shape of, for example, a box, but is in a V-shape on the printing surface of the raised part. This configuration may facilitate the formation of the groove when using a printing plate made of e.g. photo-curing resin.

Preferably, in the invention stated above, grooves extend in one direction parallel to each other and equally spaced apart. This configuration can minimize non-uniformity of printing substance placed onto the printing substrate, thereby enabling the printing substance to be transferred with an even thickness.

Preferably, in the invention stated above, the printing plate is for a flexographic press and the groove has a width, along the printing surface of the raised part, of not less than 20 μm and not more than 60 μm, a depth of not less than 25 μm and not more than 75 μm, and a distance between the grooves of not less than 20 μm and not more than 60 μm. More preferably, the printing plate includes a raised part in the shape of a nearly-rectangular frame where a side of the near-rectangle is parallel to the longitudinal direction of the groove and the raised part is arranged such that the nearly-rectangle has a side in a slanting direction relative to the moving direction of the printing plate. This configuration can reduce the occurrence of bubbles and narrownesses in the printed substance when the printing substance is a sealing material for a display panel, thereby providing printing for producing a film thickness greater than would be achieved using the conventional art. Alternatively, the printing plate may include a raised part in the shape of a nearly-rectangular frame where a side of the near-rectangle forms an angle of approximately 45° with the longitudinal direction of the groove. More preferably, the moving direction of the printing plate is generally perpendicular to the longitudinal direction of the groove. The moving direction of the printing plate may also be generally parallel to the longitudinal direction of the groove. This configuration may further decrease bubbles and narrownesses in the printed substance mentioned above when the printing substance is a sealing material for a display panel.

A press according to the present invention includes a printing plate as described above. A press with a printed plate as described above can minimize the occurrence of bubbles and narrownesses and perform printing to produce a film thickness greater than would be achieved using the conventional art.

An apparatus for manufacturing a liquid crystal device according to the present invention includes a printing plate as described above. This configuration can minimize the occurrence of bubbles and narrownesses in the printed substance. Thus, two panel substrates may be bonded together while preventing liquid crystal from leaking out or preventing air from being trapped.

A printing method according to the present invention involves a relief printing including the step of printing by pressing a printing plate having a raised part onto a printing substrate, the raised part having, on a surface for transferring printing substance, a plurality of grooves passing through from one side to another thereof, and the step of disposing the printing plate on the perimeter surface of a cylindrical plate cylinder and transferring the substance to the printing substrate by rotating the plate cylinder. The step of transferring is performed using a flexographic press. By employing this method, flexography can form printed substance with a film thickness greater than would be achieved using the conventional art.

Preferably, in the invention stated above, the raised part is in the shape of a nearly-rectangular frame, the grooves are linear ones parallel to each other and equally spaced apart, and the printing substance to be printed onto the printing substrate is a sealing material. By employing this method, flexography can print onto the printing substrate a sealing material with a thickness greater than would be the case using the conventional art.

Preferably, in the invention stated above, the sealing material is one for a flat panel display, and the grooves have a width along the surface of the raised part of not less than 20 μm and not more than 60 μm, a depth of not less than 25 μm and not more than 75 μm, and a distance between the grooves of not less than 20 μm and not more than 60 μm. This method can minimize the occurrence of bubbles and narrownesses in the printed substance, with a film thickness greater than by the conventional art.

Preferably, in the invention stated above, the step of transferring includes the step of rotating the plate cylinder while using a printing plate having grooves being parallel to one side of the near-rectangle, where the moving direction of the printing plate forms an angle of approximately 45° with the longitudinal direction of the grooves. Alternatively, the step of transferring includes the step of rotating the plate cylinder while using a printing plate that includes grooves forming an angle of approximately 45° with one side of the near-rectangle, with the moving direction of the printing plate being generally perpendicular to the longitudinal direction of the grooves. Alternatively, the step of transferring includes the step of rotating the plate cylinder while using a printing plate that includes grooves forming an angle of approximately 45° with one side of the near-rectangle, with the moving direction of the printing plate being parallel to the longitudinal direction of the grooves. This method can further minimize the occurrence of bubbles or narrownesses in the printed substance.

A method of manufacturing a liquid crystal device according to the present invention includes the printing method described above. The printing method described above may be employed in a method for manufacturing liquid crystal devices to provide printing for producing a film thickness greater than would be achieved using the conventional art, while preventing sealed liquid crystal from leaking out or preventing air from being trapped in the liquid crystal when the two panel substrates are bonded together.

BRIEF DESCRIPTION OF THE DRAWINGS

FIG. 3 is a plan view of a printing plate used for a first printing test, shown together with the moving direction.

BEST MODES FOR CARRYING OUT THE INVENTION

FIRST EMBODIMENT

Figure 1A:
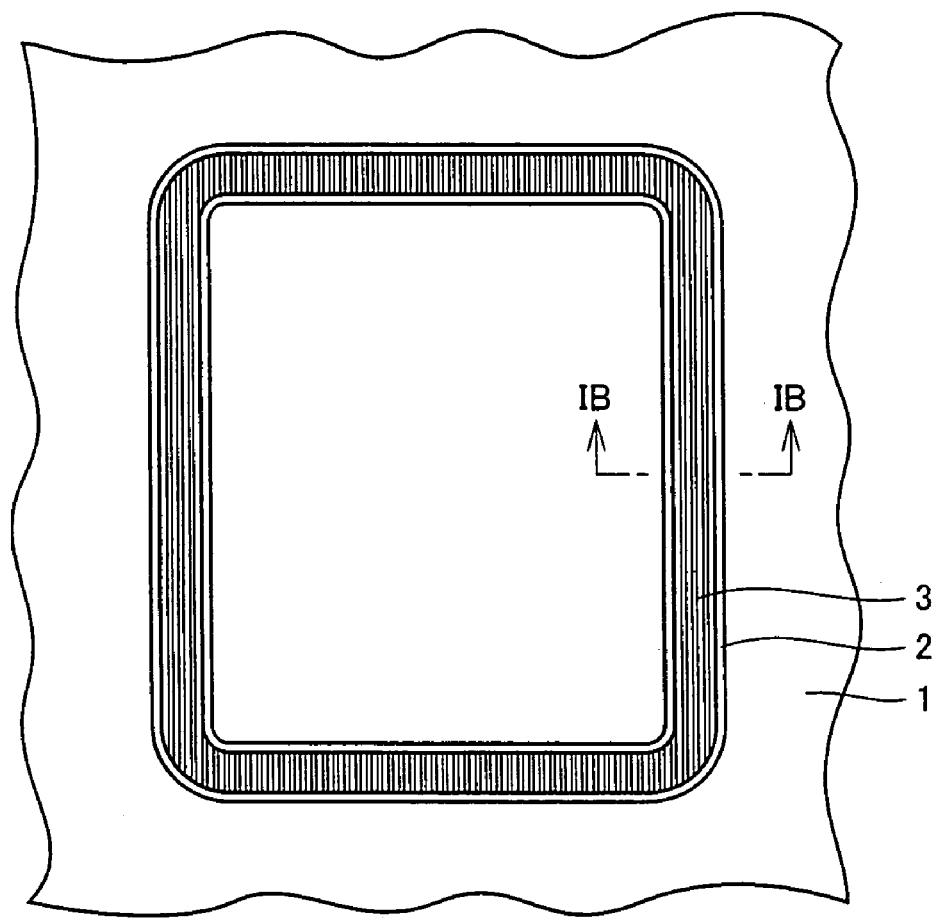
FIG. 1A is a plan view of a printing plate of a first embodiment according to the present invention.
Figure 1B:
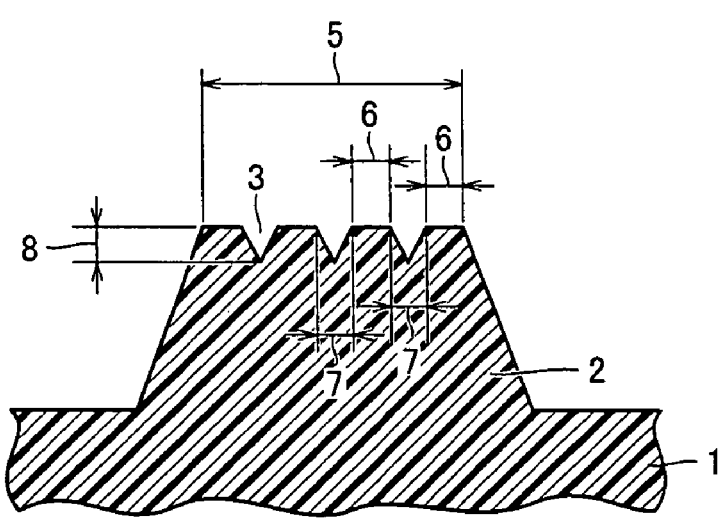
FIG. 1B is a cross sectional view in the direction of the arrow of IB—IB in FIG. 1A.

Referring to FIGS. 1A and 1B, a printing plate of a first embodiment according the present invention will be described. FIG. 1A is a plan view showing a raised part of a printing plate, while FIG. 1B is a cross sectional view in the direction of the arrow of IB—IB in FIG. 1A.

Raised part 2 on a main surface of printing plate 1 is in the shape of a nearly-rectangular frame with arc corners. Raised part 2 has a trapezoidal cross section with the shorter one of its bases representing the printing surface. The printing surface i.e. the top of raised part 2 has a plurality of linear grooves 3 parallel to one side of the near-rectangle. In the present embodiment, one side of the near-rectangle parallel to grooves 3 has three grooves 3. All of grooves 3 pass from one side to another of raised part 2. The grooves are parallel to each other and spaced apart at a certain distance. One side of the near-rectangle is parallel to one of the edges of printing plate 1. Grooves of the kind shown in FIG. 1A are hereinafter referred to as "parallel grooves". In the present embodiment, the parallel grooves hold printing substance to provide an increased thickness of the printed substance.

In the present embodiment, raised part 2 is made of photo-curing resin. Providing the photo-curing resin with a mask and then illuminating it with ultraviolet light causes the illuminated region thereof to be cured, where a portion thereof that is shadowed by the mask remains uncured and is subsequently removed to form a groove. In the present method, the region thereof that is shaded by the mask is triangular. This can be utilized to facilitate the formation of grooves with a triangular cross section, which is the case with the cross section of the grooves of the present embodiment. Alternatively, the shape of the cross section may be a trapezoid or the like and is not limited to a triangle.

The inventors have conducted numerous printing tests to identify the function and effect of the printing plate according to the present invention. Two such tests are illustrated, which are referred to as the first and second printing tests. The first printing test compares the performances of different configurations of the raised part of the printing plate, created by the inventors. For comparison with the printing plates according to the present invention, a printing plate was selected having a raised part with lattice-shaped grooves and one having a raised part with a wide groove. The results of the first printing test will be described using the two printing plates selected and the printing plate according to the present embodiment.

(First Printing Test)

Figure 8A:
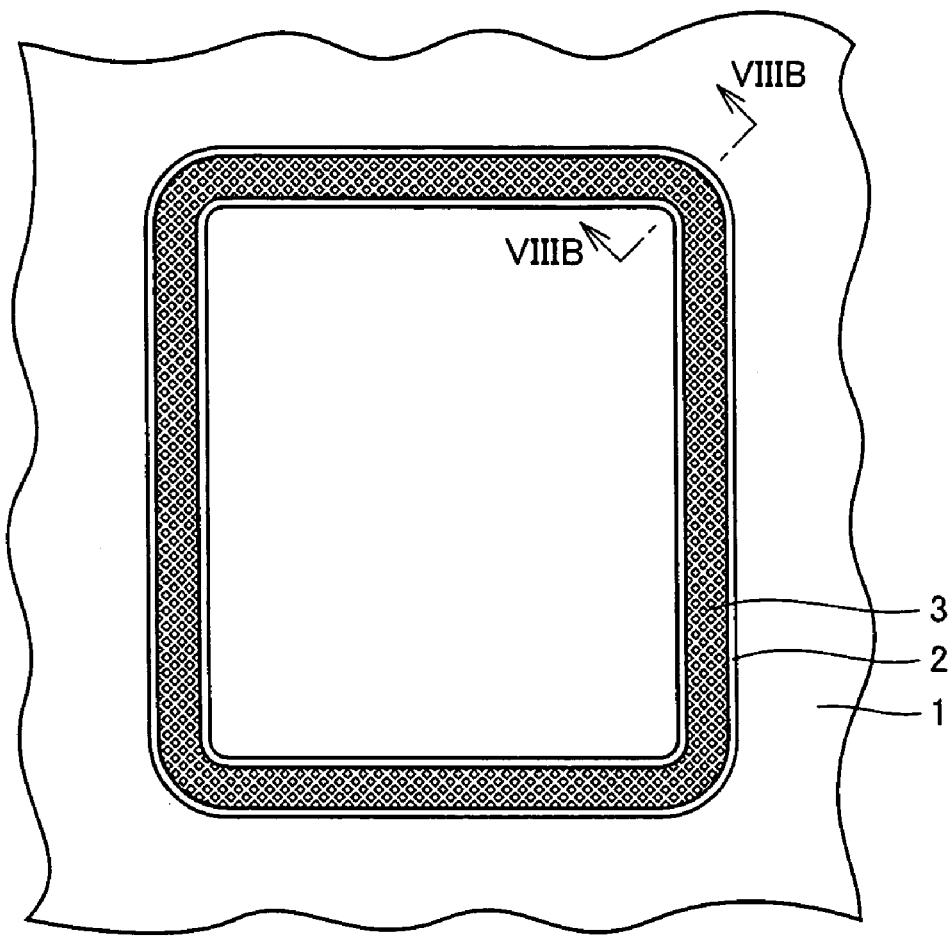
FIGS. 8A and 8B illustrate one printing plate provided for comparison.
Figure 8B:
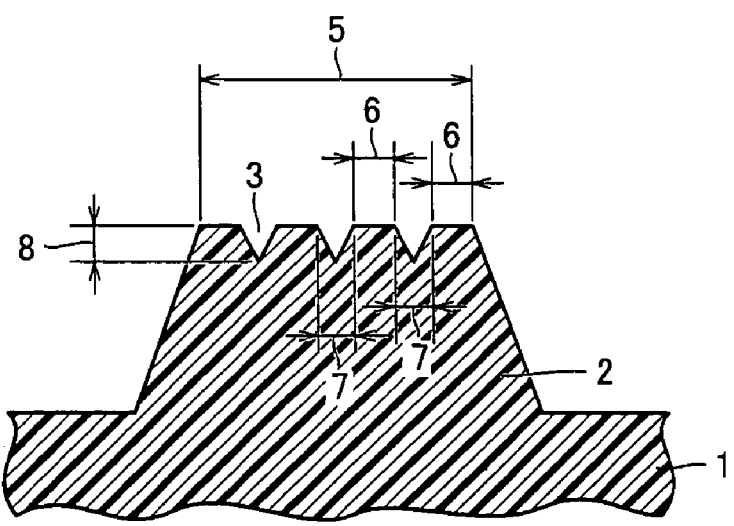
Figure 9A:
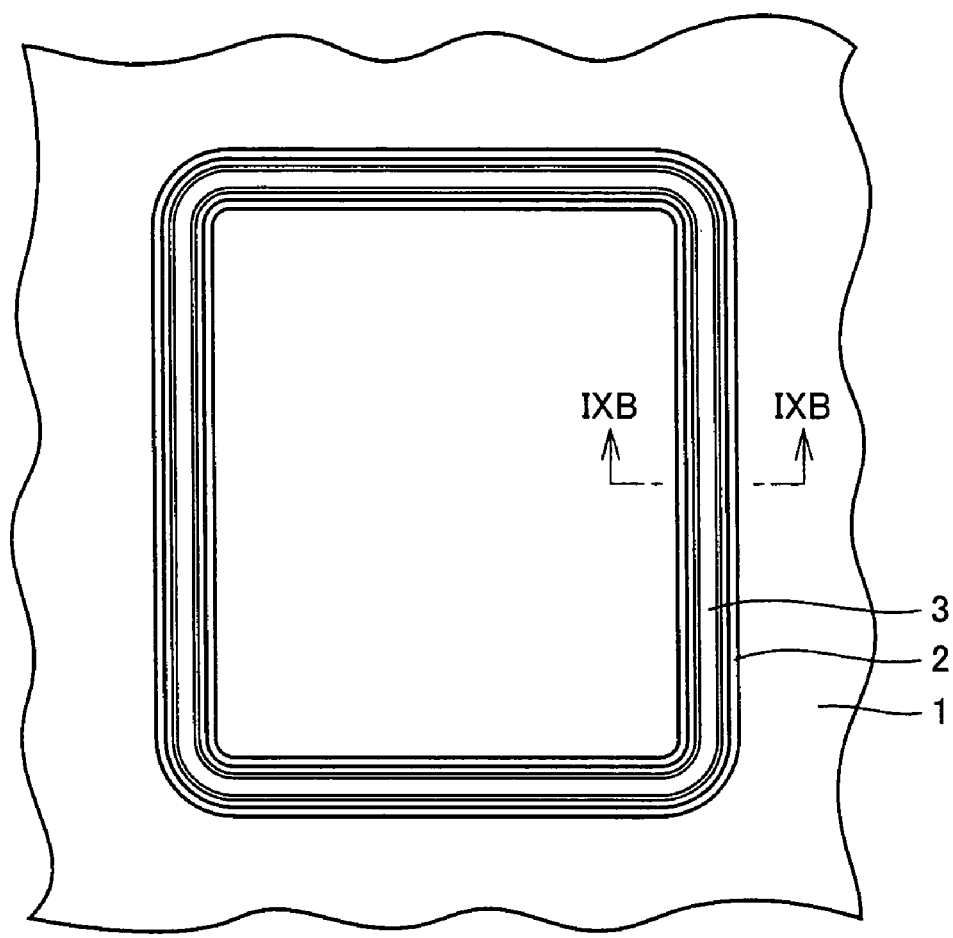
FIGS. 9A and 9B illustrate another printing plate provided for comparison.
Figure 9B:
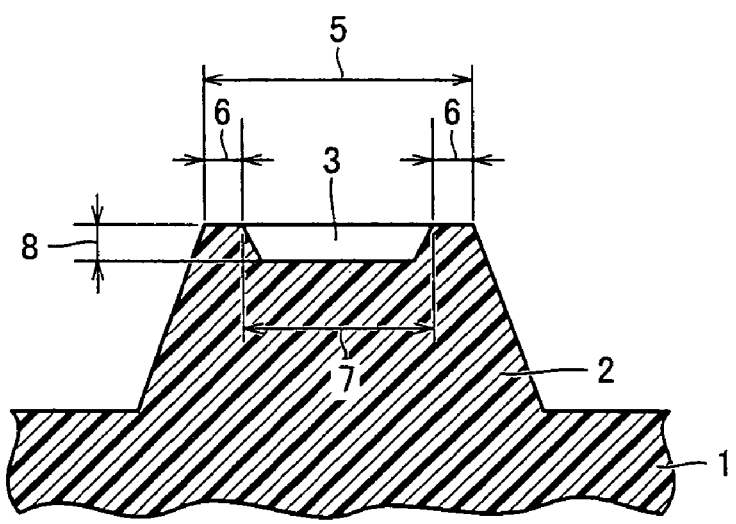
Figure 10:
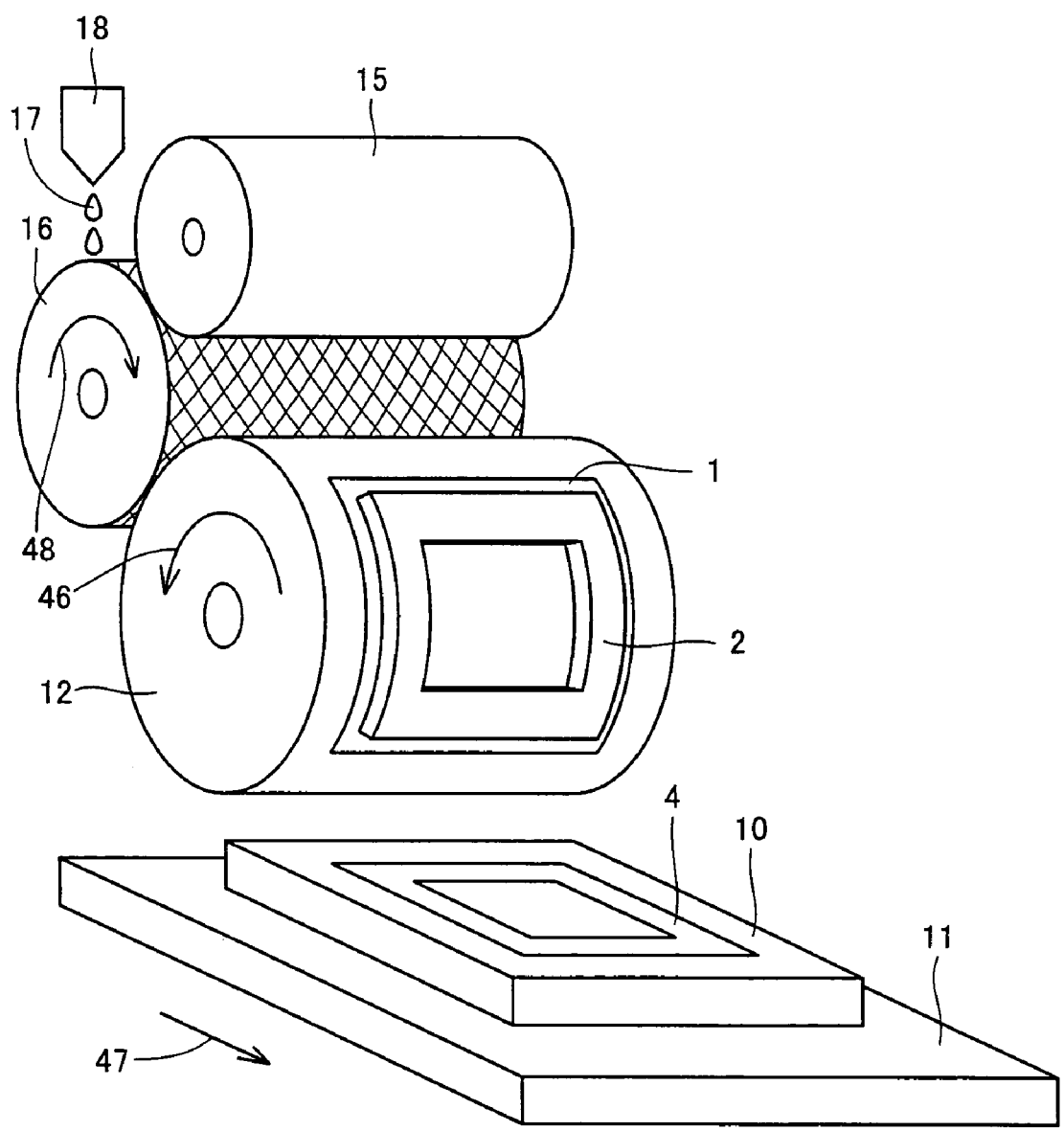
FIG. 10 is a perspective view of a printing unit of a flexographic press according to the conventional art.

Configurations of raised part 2 of the printing plate for comparison used in the first printing test are shown in FIGS. 8A and 8B and FIGS. 9A and 9B. FIGS. 8A and 8B show a raised part with lattice-shaped grooves 3. FIG. 8A is a plan view of printing plate 1, while FIG. 8B is a cross sectional view in the direction of the arrow of VIIIB—VIIIB in FIG. 8A. Grooves 3 have a triangular cross section and are parallel to each other. The grooves in this configuration will be referred to as "intersecting grooves". The intersecting grooves are provided over the entire printing surface of raised part 2. FIGS. 9A and 9B show a groove 3 having a relatively large width, which will be referred to as a "wide groove". FIG. 9A is a plan view of raised part 2. The wide groove is frame-shaped and parallel to the contour of raised part 2. FIG. 9B is a cross sectional view in the direction of the arrow of IXB—IXB in FIG. 9A. The printing surface of raised part 2 has one wide groove 3 which has a trapezoidal cross section. The shorter one of the bases of the trapezoid provides the bottom surface of groove 3.

The first printing test arranges a plurality of raised parts regularly on a rectangular printing plate 1 as shown in FIG. 3, where each of the sides of a nearly-rectangular raised part is parallel to the corresponding one of the sides of printing plate 1. For each of the configurations of the grooves, four types of raised parts were provided having different dimensions of the raised parts and grooves to conduct the first printing test. Raised parts 13a–13d have different groove dimensions and different outer dimensions. To illustrate the configurations of the raised parts and grooves, raised parts having different printing surface widths 5, and different groove distances 6, groove widths 7 and groove depths 8 were formed, which are labeled as Test Nos. <1>–<4>. As the test number increases from <1> to <4>, larger grooves are provided in the raised part to produce increased film thickness of the printed substance.

In the present embodiment, printing surface width 5, i.e. the width of the printing surface of the raised part, ranges from 300 to 360 μm, the distance 6 between the grooves that defines the pitch for the grooves from 50 to 20 μm, groove width 7 from 20 to 80 μm, and groove depth 8, i.e. the depth of each groove, from 25 to 100 μm.

In FIG. 3, raised parts 13a–13d have configurations of Test Nos. <1>–<4>, respectively. To eliminate the dependence of the test results on the location of a raised part within printing plate 1, the arrangement of Test Nos. <1>–<4> is altered from column to column. Printing is performed in the direction indicated by moving direction 40.

Figure 4:
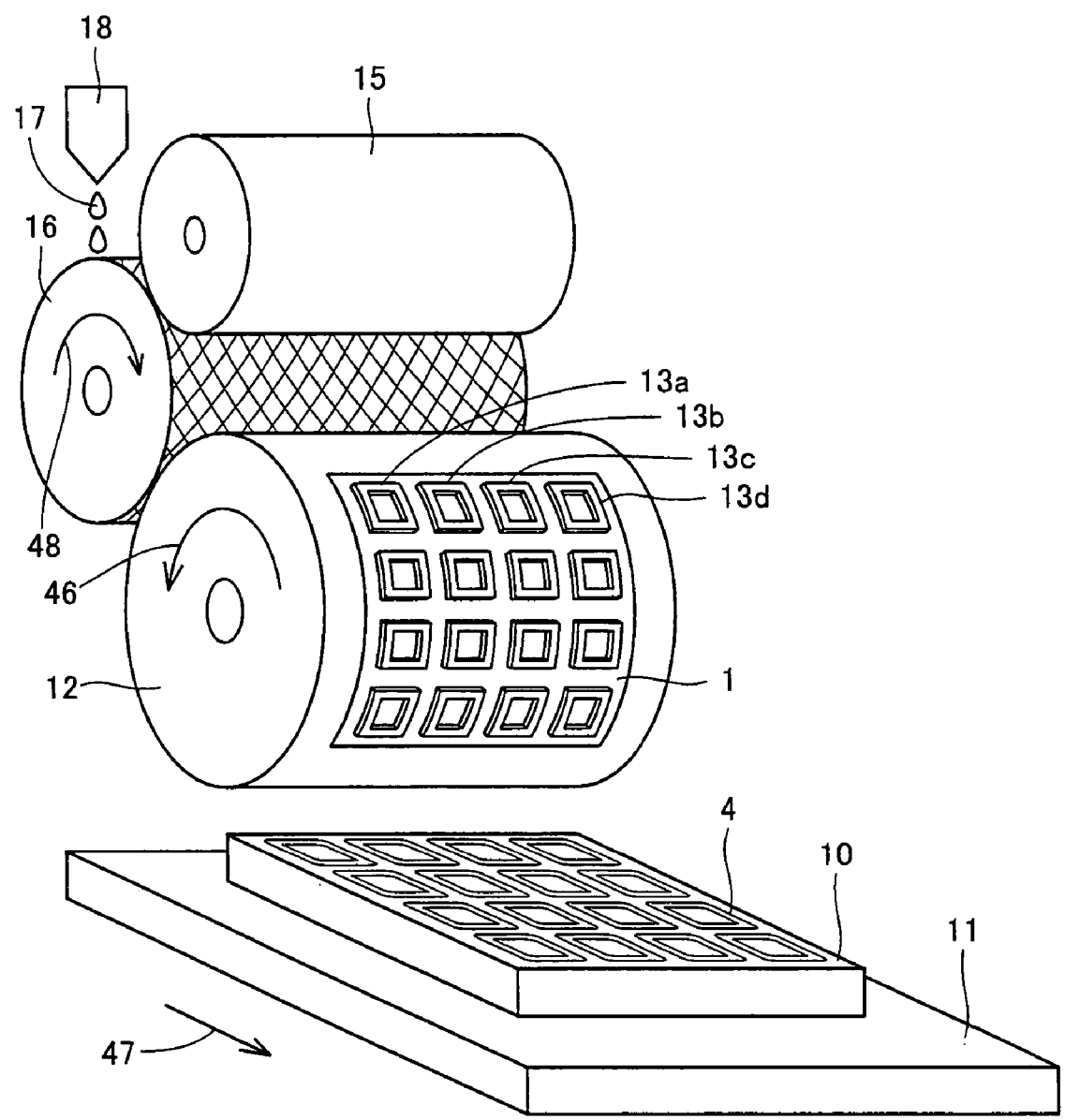
FIG. 4 is a perspective view of a printing unit of a flexographic press used for first and second printing tests.

As shown in FIG. 4, printing plate 1 is attached onto the perimeter surface of plate cylinder 12. In the first printing test, plate cylinder 12 is rotated in the direction of arrow 46, and printing substrate 10, together with impression table 11, is moved in the direction of arrow 47, as in the conventional art. Impression table 11 is moved with the direction of its advancement being parallel to the longitudinal direction of printing plate 1 to perform printing on printing substrate 10. The first printing test used a plate cylinder 12 with a radius of 127 mm and operated it with a print speed of 1.0 m/min. as measured by the peripheral speed of plate cylinder 12, where the printing material was a UV curing sealing material with a viscosity of 350 Pa·s.

Figure 11:
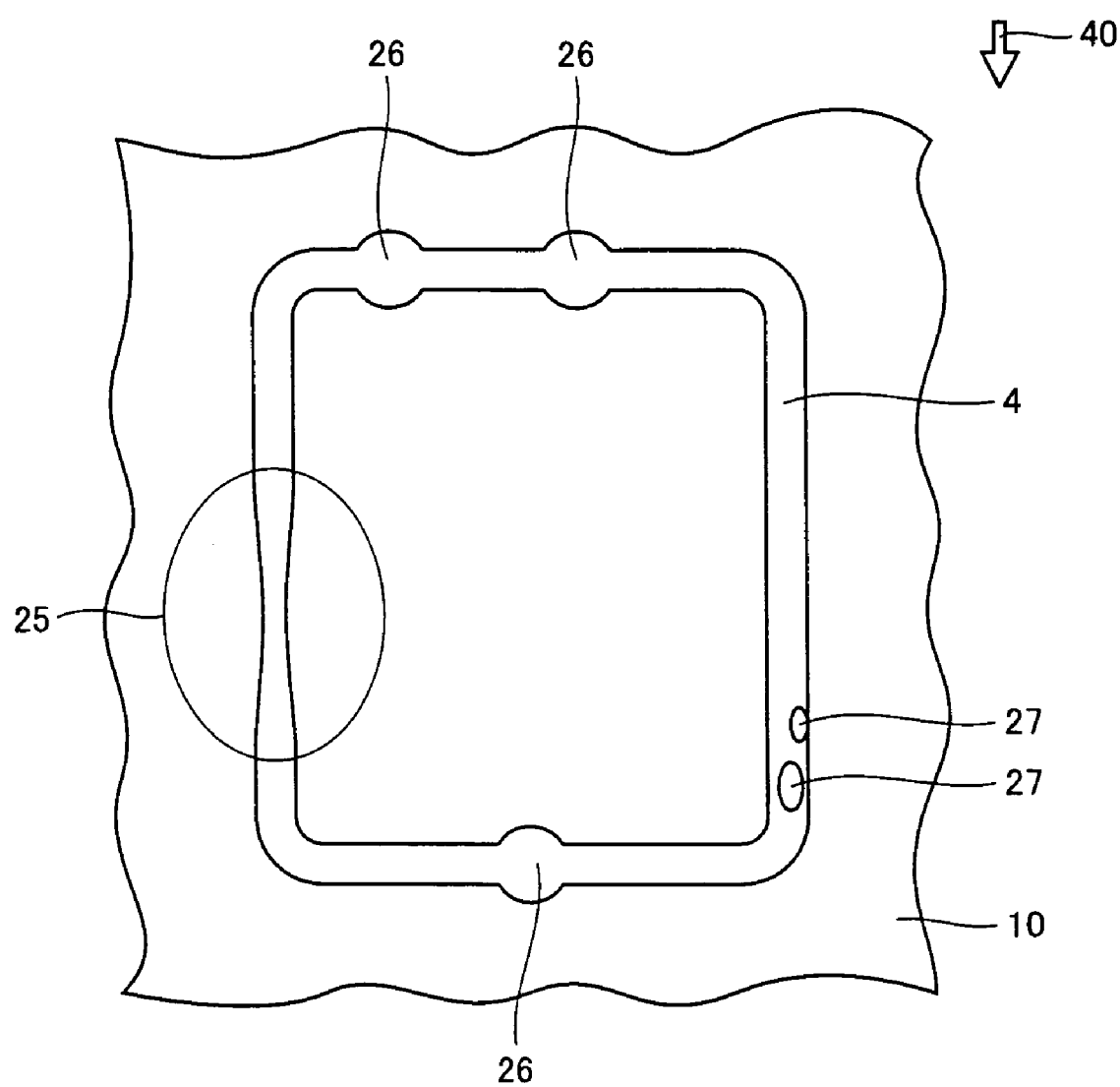
FIG. 11 is a plan view of a printing substrate illustrating defects occurring while printing substance is printed onto a printing substrate.

To evaluate of the results, the thickness and appearance of the printed substance i.e. printing substance printed onto a printing substrate were observed to determine its quality. The appearance was observed by visual inspection or microscopy. The criterion for the evaluation was whether or not the printed substance included bubbles or narrownesses. FIG. 11 shows examples of bubbles 27 and a narrowness 25. FIG. 11 illustrates defects of the printed substance transferred to printing substrate 10 when printing was performed in the moving direction 40.

The results from the first printing test are shown in Table 1 below. Table 1 also includes the results from a first printing test with the oblique grooves in a second embodiment, which will be described below with reference to the second embodiment.

ness to be produced was between 7 to 10 μm as in Test No. <1>. Similarly, the use of a printing plate with the wide groove allowed printing without bubbles or narrownesses for a film thickness ranging from 12 to 14 μm as in Test No. <1>. In Test Nos. <2>–<4> of each groove, where the grooves had larger cross sections to produce greater film thicknesses, the film thicknesses were actually increased for these types of grooves but bubbles 27 or narrownesses 25 were observed in printed substance 4.

On the contrary, the first printing test for the parallel grooves, i.e. using a printing plate according to the present embodiment, resulted in a good printed substance 4 without bubbles 24 or narrownesses 25 with a film thickness of up to 30–33 μm as in Test No. <3>.

Based on the foregoing, a preferable mechanism in the raised part for fixing transferred substance includes grooves passing through from one side to another of the raised part. Preferably, all the grooves are parallel to each other and equally spaced apart.

The results of the first printing test were provided by using a UV curing sealing material for flat panel displays having a viscosity of 350 Pa·s, although similar effects were observed when a UV curing sealing material having a viscosity ranging from 250 to 500 Pa·s was used.

The first printing test was conducted with a constant moving direction and with varying configurations of the grooves. More specifically, printing was performed such that the direction in which the raised part came in contact with the printing substrate was parallel with the longer ones of the sides of the nearly-rectangular raised part. As shown in the results from the first printing test, the use of a printing plate having a raised part with the parallel grooves provided a printed substance with increased film thickness and with a higher precision in size. However, increasing the print speed to improve productivity sometimes caused narrownesses or bubbles even with a printing plate with the parallel grooves and, in addition, produced a ball-shaped portion of the

TABLE 1

Results from First Printing Test [μm]

| Groove Type | Test No. | Dimension | | | | Results from Printing Test | | |
|---|---|---|---|---|---|---|---|---|
| | | Printing Surface Width | Groove Distance | Groove Width | Groove Depth | Film Thickness | Line Width | Bubble/ Narrowness |
| Parallel | <1> | 300 | 50 | 20 | 25 | 14~17 | 330~350 | ○ |
| | <2> | 300 | 45 | 40 | 50 | 26~28 | 340~365 | ○ |
| | <3> | 300 | 20 | 60 | 75 | 30~33 | 355~370 | ○ |
| | <4> | 360 | 20 | 80 | 100 | 33~39 | 440~460 | X |
| Oblique | <1> | 300 | 60 | 20 | 25 | 13~16 | 325~345 | ○ |
| | <2> | 300 | 45 | 40 | 50 | 25~27 | 330~355 | ○ |
| | <3> | 300 | 20 | 60 | 75 | 30~34 | 340~360 | ○ |
| | <4> | 360 | 20 | 80 | 100 | 32~37 | 425~450 | X |
| Intersecting | <1> | 300 | 60 | 20 | 25 | 7~10 | 315~330 | ○ |
| | <2> | 300 | 45 | 40 | 50 | 15~17 | 320~340 | X |
| | <3> | 300 | 20 | 60 | 75 | 17~25 | 320~350 | X |
| | <4> | 360 | 20 | 80 | 100 | 19~30 | 405~430 | X |
| Wide | <1> | 300 | 60 | 180 | 20 | 12~14 | 330~360 | ○ |
| | <2> | 300 | 60 | 180 | 30 | 15~20 | 335~365 | X |
| | <3> | 300 | 60 | 180 | 40 | 20~26 | 345~380 | X |
| | <4> | 360 | 60 | 240 | 40 | 21~27 | 415~450 | X |

○: No bubble or narrowness
X: Bubble or narrowness present

The results from the first printing test show that the use of a printing plate with the intersecting grooves, a groove configuration that was provided for comparison, allowed printing without bubbles or narrownesses when a film thickness printed substance in some locations (the ball-shaped portion is hereinafter referred to as a "ball"). FIG. 11 illustrates exemplary balls 26. A ball 26 is produced when printing substance 17 sticks to printing plate 1, which may cause the substance to be extended like a long thread. Balls 26 were produced particularly in those of the sides of raised part 2 that have grooves 3 with a relatively small length.

(Second Printing Test)

The quality of the printed substance is affected by the angle formed by the longitudinal direction of groove 3 and the moving direction. The effect of this angle on the quality of the printed substance was considered in a second printing test. The consideration was made by comparing the printed substance that was printed with a groove 3 in a slanting direction relative to, i.e. not parallel to, the moving direction, and the printed substance that was printed with a groove 3 parallel to the moving direction, where their respective print speeds were altered to compare the performance for the moving directions. In the present example, the longitudinal direction of groove 3 deviated from the moving direction at an angle of 45°.

Figure 5:
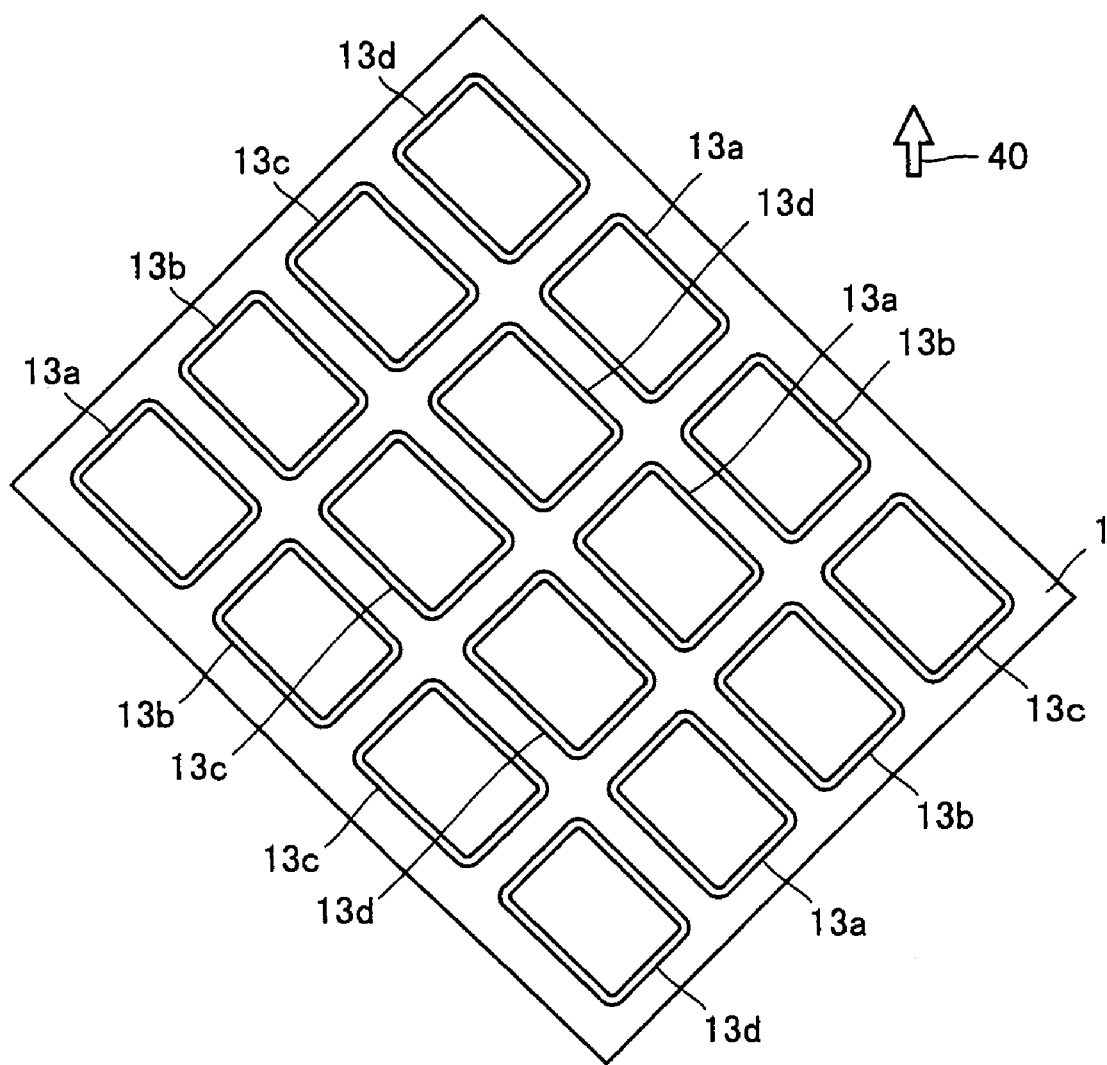
FIG. 5 is a plan view of a printing plate used for a second printing test, shown together with the moving direction.
Figure 6:
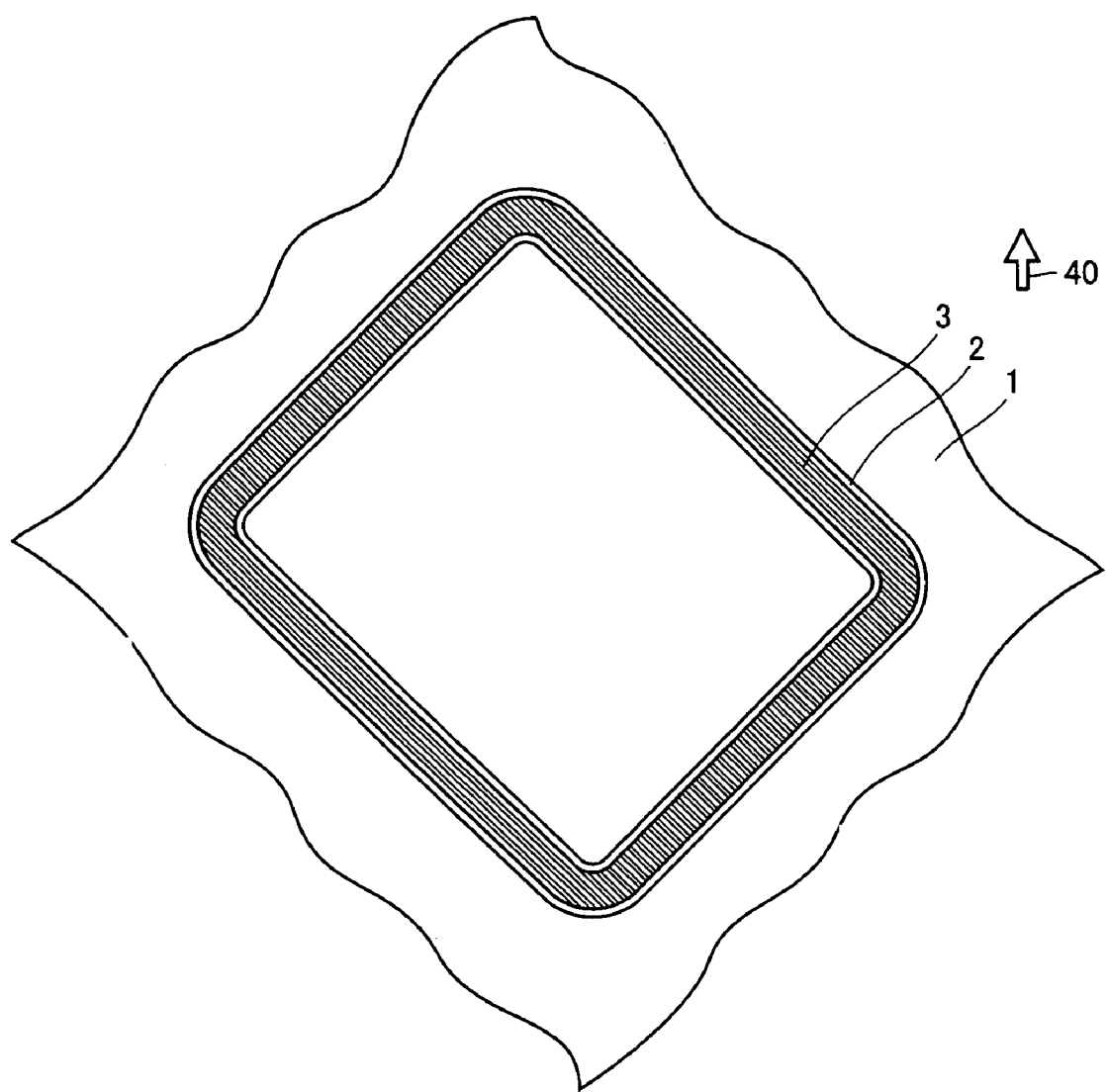
FIG. 6 illustrates a correlation between the printing plate and the moving direction in the second printing test in the first embodiment of the present invention.

FIGS. 5 and 6 are plan views of a printing plate 1 illustrating the method of the second printing test. As shown in FIG. 5, it is similar to the first printing test in that the raised parts with parallel grooves are disposed regularly on a main surface of printing plate 1, and the arrangement of raised parts 13*a*–13*d* is also similar to that of the first test. Comparison was made referring only to the printing plates with raised parts corresponding to Test No. <2> in Table 1. The second printing test also provided that grooved printing plate 1 was turned by 45° counterclockwise when being brought into contact with the printing substrate. Moving direction 40 in FIGS. 5 and 6 is the direction in which the plate on the plate cylinder is rotated i.e. in which the printing is performed. As shown in FIG. 6, the longitudinal direction of the parallel grooves forms an angle of 45° with the moving direction. This condition was maintained while the print speed was altered to perform the printing test. The results of the second test are shown in Table 2.

Table 2 also includes the results of a printing test with the oblique grooves in the second embodiment, which will be described referring to the second embodiment.

TABLE 2

Results from Second Printing Test

| | | | Test Results | | | |
|---|---|---|---|---|---|---|
| | | | Print Speed | | | |
| Groove Type | Turning Angle | Type | 0.7 m/min. | 1.0 m/min. | 1.4 m/min. | 2.0 m/min. |
| Parallel <2> | 0° | ball | ○ | ○ | X | X |
| | | bubble/ narrowness | ○ | ○ | X | X |
| | 45° Counter clockwise | ball | ○ | ○ | ○ | X |
| | | bubble/ narrowness | ○ | ○ | ○ | X |
| Oblique <2> | 0° | ball | ○ | ○ | X | X |
| | | bubble/ narrowness | ○ | ○ | ○ | X |
| | 45° Counter clockwise | ball | ○ | ○ | ○ | ○ |
| | | bubble/ narrowness | ○ | ○ | ○ | X |
| | 45° Clockwise | ball | ○ | ○ | ○ | ○ |
| | | bubble/ narrowness | ○ | ○ | ○ | ○ |

○: No ball, or no bubble or narrowness
X: Ball present, or bubble or narrowness present In Table 2, the column "Turning Angle" indicates angles formed by a longer side of the nearly-rectangular raised part and the moving direction, and the direction of turn. 0° indicates that the direction of a longer side of the near-rectangle is the same as the moving direction. The results were evaluated considering the occurrence of bubbles or narrownesses as in the first printing test as well as the occurrence of balls. The test was conducted with different print speeds for 0° and for 45° counterclockwise. For 0°, it is similar to the printing method in the first printing test, where only the print speed is changed. For 45° counterclockwise, the printing was performed in the moving direction 40, as shown in FIG. 6. The print speed is measured on the perimeter surface of plate cylinder 12 i.e. the speed with which the printing substrate is moved during printing. For 0°, the printed substance had no balls, bubbles or narrownesses at a print speed of not more than 1.0 m/min. At the print speed of 1.4 m/min., both balls and bubbles or narrownesses were produced.

On the contrary, the printing with printing plate 1 turned by 45° counterclockwise resulted in a printed substance without balls, bubbles or narrownesses at a print speed of not more than 1.4 m/min. When the speed was increased to 2.0/min., balls, bubbles or narrowness were produced.

Thus, when using parallel grooves, the printing may be conducted with a slanting direction of movement relative to the longitudinal direction of the grooves to increase the print speed while maintaining high quality of the printed substance, contributing to the improvement in productivity. Although the present embodiment illustrates the printing with the direction of the parallel grooves forming an angle of 45° with the moving direction, it is not limited to this angle.

SECOND EMBODIMENT

Figure 2A:
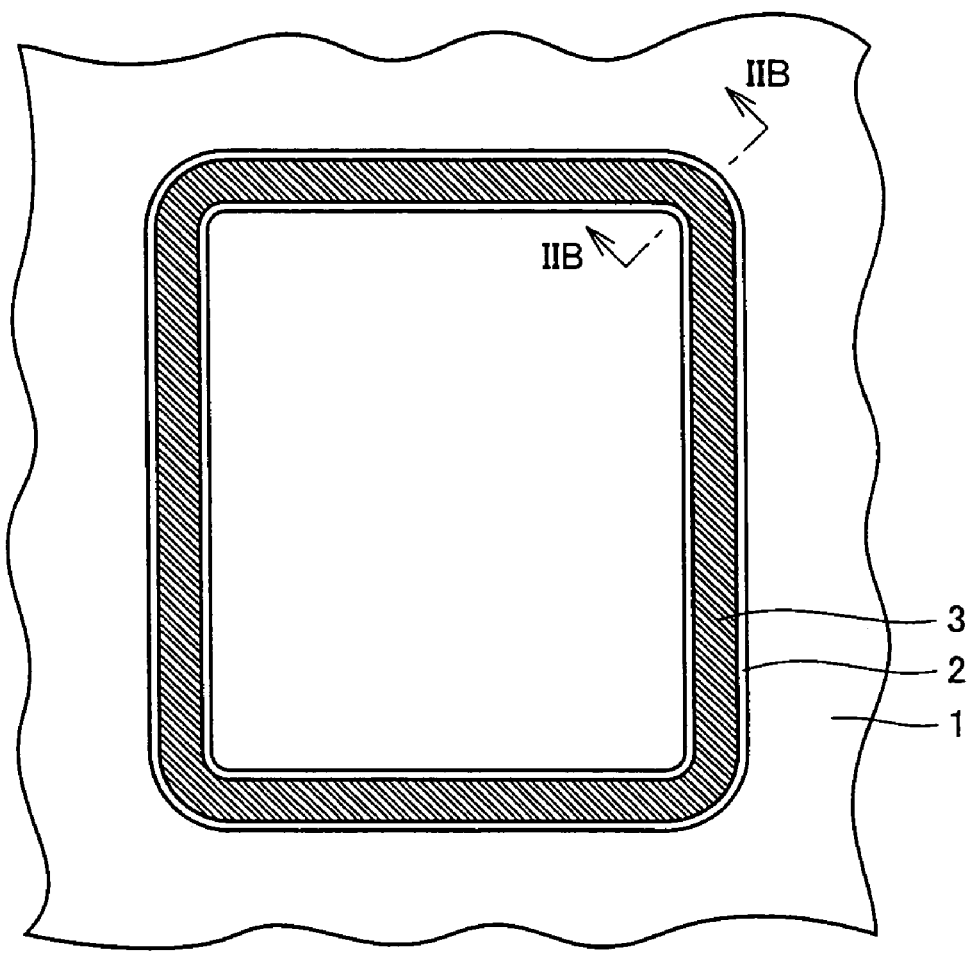
FIG. 2A is a plan view of a printing plate of a second embodiment according to the present invention.
Figure 2B:
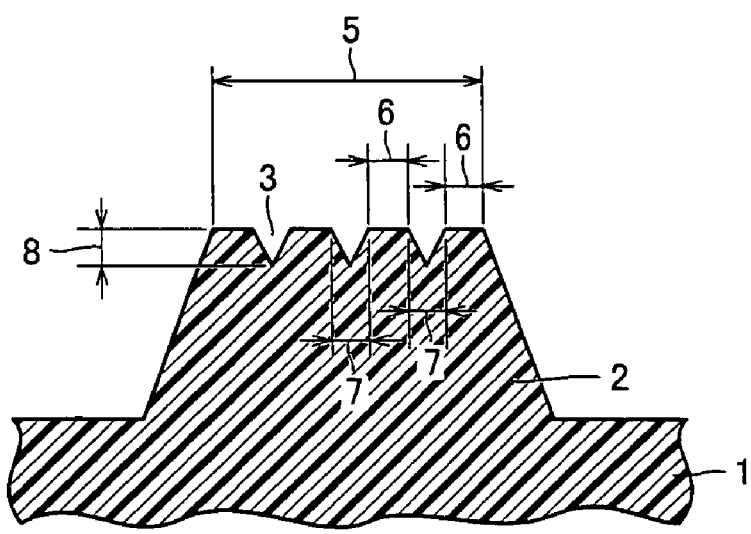
FIG. 2B is a cross sectional view in the direction of the arrow of IIB—IIB in FIG. 2A.

Referring to FIGS. 2A and 2B, a printing plate of a second embodiment according to the present invention will be described. FIG. 2A is a plan view showing a raised part of a printing plate, while FIG. 2B is a view of the printing plate in the direction of the arrow of IIB—IIB in FIG. 2A.

Again, in the present embodiment, the shape of the raised part on the printing plate is a nearly-rectangular frame. In the first embodiment, grooves 3 are parallel to a side of the near-rectangle. The present embodiment is different from the first embodiment in that the longitudinal direction of grooves 3 are in a slanting direction, i.e., neither parallel nor perpendicular to a side of the near-rectangle. Such grooves are hereinafter referred to as "oblique grooves". In the present embodiment, the grooves shown in FIG. 1A are turned counterclockwise by 45° to provide the grooves shown in FIG. 2A.

In the cross section along the line IIB—IIB, three grooves 3 are provided. Grooves 3 are parallel to each other. Similar to the first embodiment, the grooves pass through from one side to another of the raised part.

(First Printing Test)

Table 1 provided above shows the results of a first printing test conducted in a similar manner to that of the first embodiment.

In the present embodiment, printing surface width 5 i.e. the width of the printing surface of a raised part ranges from 300 to 360 μm, distance 6 between the grooves which determines the pitch for the grooves from 60 to 20 μm, groove width 7 from 20 to 80 μm, and groove depth 8 i.e. the depth of a groove from 25 to 100 μm.

Of Test Nos. <1>–<4>, Test No. <4> with largest grooves exhibited increased film thickness but caused bubbles or narrownesses in the printed substance as well, while grooves that produce film thicknesses of up to 30–34 μm as in Test No. <3> provided a good printed substance with a greater film thickness and without bubbles or narrownesses. This is an improvement over the intersecting and wide grooves, similar to the first embodiment. For example, comparison is made among the test results from the four groove configurations in terms of Test No. <2>. The parallel and oblique grooves provide printing without bubbles or narrownesses, while the intersecting and wide grooves cause bubbles or narrownesses.

The results of the first printing test were provided by using a UV curing sealing material for flat panel displays with a viscosity of 350 Pa·s, as in the first embodiment. However, using a UV curing sealing material with a viscosity ranging from 250 to 500 Pa·s exhibited similar effects.

Both the first printing test for the first embodiment and the first printing test for the second embodiment produced good results for the groove configurations of Test Nos. <1>–<3>. Consequently, grooves of the two types are preferred to have the configurations of Test Nos. <1>–<3>. In other words, the grooves in the raised part preferably have a width along the printing surface of a raised part, with which the printing substrate comes in contact, of not less than 20 µm and not more than 60 µm, a depth of not less than 25 µm and not more than 75 µm, and a distance between the grooves of not less than 20 µm and not more than 60 µm. These groove configurations are particularly useful when sealing material for flat panel displays using e.g. liquid crystal is selected as the printing substance, and a panel substrate for liquid crystal panels as the printing substrate.

(Second Printing Test)

A second printing test was conducted in a similar manner to that of the first embodiment. In the first embodiment, it is obvious that the test results are the same for a clockwise turn by 45° and for a counterclockwise turn by 45°. In the present embodiment, however, the angle formed by the moving direction and the longitudinal direction of the grooves differs depending upon the direction of turn, and thus the second printing test was conducted for both the clockwise turn by 45° and the counterclockwise turn by 45°.

Figure 7A:
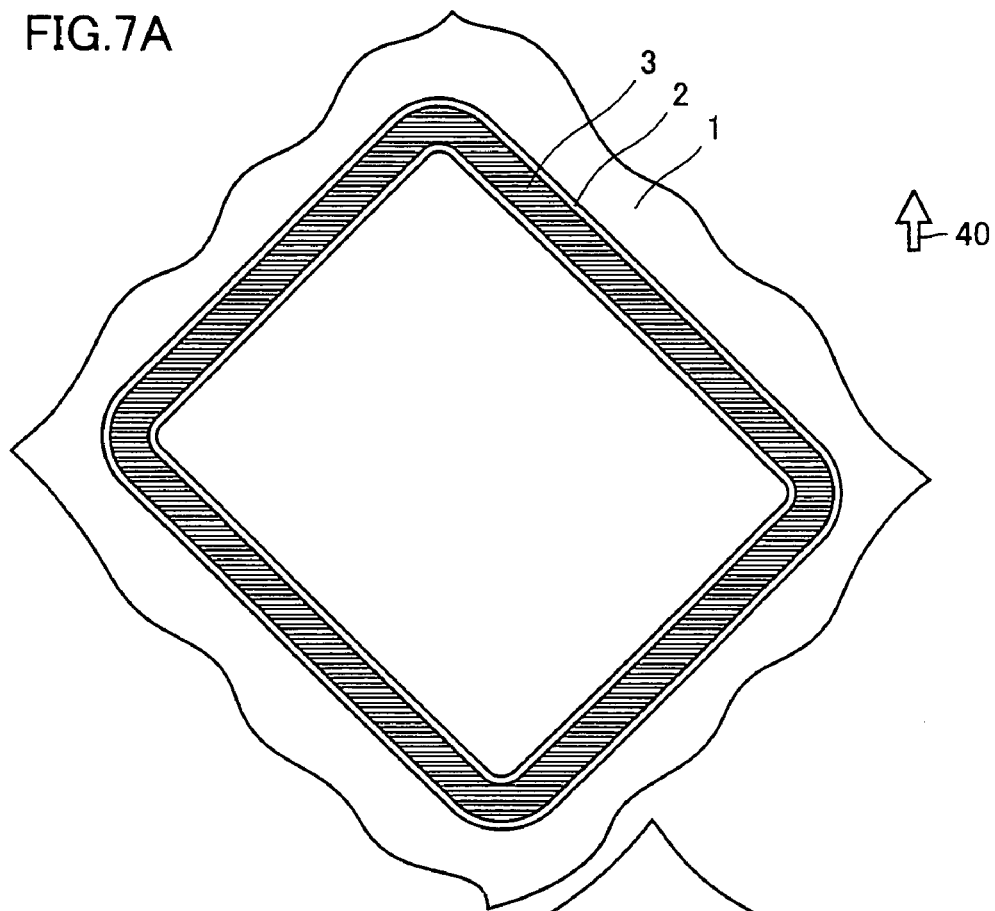
FIGS. 7A and 7B illustrate correlations between the printing plate and the moving direction in the second printing test in the second embodiment of the present invention.
Figure 7B:
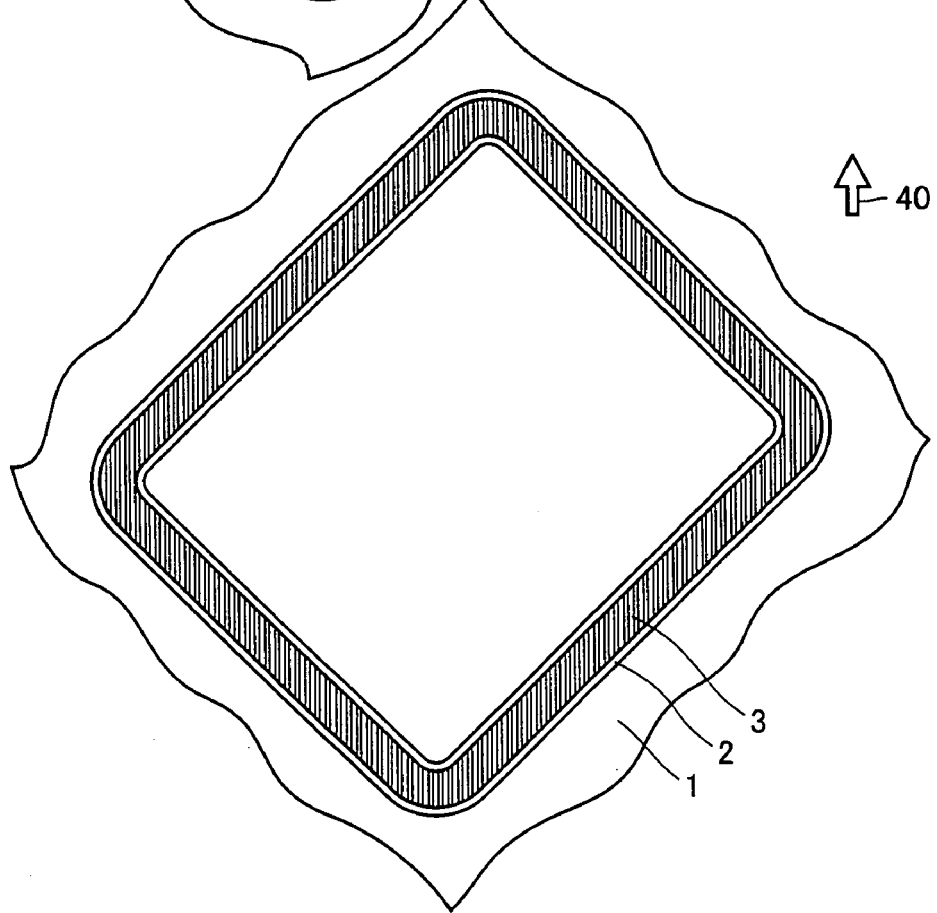

FIGS. 7A and 7B illustrate in plan view the relations between moving direction 40 and grooves 3. FIG. 7A shows a raised part 2 turned counterclockwise by 45° with respect to moving direction 40. FIG. 7B shows a raised part 2 turned clockwise by 45° with respect to moving direction 40. In the method shown in FIG. 7A, the longitudinal direction of the grooves is perpendicular to moving direction 40, while in the method shown in FIG. 7B the longitudinal direction of the grooves is parallel to moving direction 40.

The selected grooves are the oblique grooves of Test No. <2> out of <1> to <4> in the first printing test. The configuration of the grooves and the dimension of cross section are identical with those for the parallel grooves of <2> used in the second printing test in the first embodiment. The results from the second printing test are shown in Table 2 provided above.

For a turning angle of 0°, balls were produced at a print speed of 1.4 m/min. or more, while bubbles or narrownesses were not produced at a speed of 1.4 m/min. or less. In the first embodiment, the results from the turning angle of 0° indicate the occurrence of bubbles or narrownesses at a print speed of 1.4 m/min., and thus the printing plate of the present embodiment is an improvement over that of the first embodiment. For a turning angle of 45° counterclockwise (the testing method shown in FIG. 7A), neither balls nor bubbles or narrownesses were produced at a print speed of 1.4 m/min. or less, while bubbles or narrownesses were produced at a print speed of 2.0 m/min. A turning angle of 45° clockwise (the testing method shown in FIG. 7B) permitted printing without balls or bubbles or narrownesses at a print speed of 2.0 m/min., as well.

Considering these results together with those in the first embodiment, the oblique grooves are in general superior to the parallel ones in that it is less likely that balls or the like are produced even with an increased print speed. Furthermore, for the oblique grooves, printing is preferably carried out with moving direction 40 being either perpendicular or parallel to the grooves, as shown in FIGS. 7A and 7B. The description is not repeated as to other functions and effects similar to those for the first embodiment.

When it is to be avoided that a side of the raised part is parallel or perpendicular to the moving direction as shown in the second printing test, a raised part may be pre-formed in a slanting direction on a main surface of the printing plate instead of placing a printing plate onto the plate cylinder in a slanting direction. In other words, in FIG. 3, each of the sides of nearly-rectangular raised parts 13a to 13d is parallel to the corresponding one of the sides of printing plate 1. Alternatively, the raised parts may be provided on printing plate 1 such that a side of raised parts 13a to 13d and a side of printing plate 1 form an angle of 45°, for example, and the printing is conducted in moving direction 40, which would provide the same effect. For the oblique grooves shown in FIGS. 2A and 2B, a side of the near-rectangle forming an angle of 45° with the moving direction will result in the longitudinal direction of the grooves being either parallel or perpendicular to the moving direction, thereby allowing rapid printing with an increased film thickness without producing balls or narrownesses.

A printing plate or a printing method illustrated in the first and second embodiments may be applied in flexography to allow flexographic printing to produce a film thickness greater than would be achieved using the conventional art. Further, the invention as described above may be applied in an apparatus and method for manufacturing liquid crystal devices to allow printing a sealing material that may be used for bonding panel substrates together for a liquid crystal panel with an improved film thickness on the surface of the panel substrate, thereby providing improved productivity and quality over the conventional art.

The grooves illustrated in the first and second embodiments have a triangular cross section. As stated above, there may be other configurations such as a trapezoid or a semicircle. Further, the configuration of the cross section of a raised part is not limited to a trapezoid and may be a rectangle, for example. Further, the configuration of the raised part, which forms the design for printing, is not limited to a frame and may be linear, or a raised part may cover an entire rectangular region in a planar manner and may not include an empty area within it, as is the case with the frame-shaped raised part.

The above embodiments primarily use a printing substrate and a printing substance that can be used for bonding together panel substrates for liquid crystal, although the present invention may be applied to relief printing in general and is not limited to a printing apparatus and method in conjunction with liquid crystal devices.

As stated above, according to the present invention, relief printing requiring a film thickness greater than would be achieved using the conventional art may use a printing plate having a raised part with grooves passing through from one side to another thereof on its printing surface to allow high precision printing for any forms. When the printed substance is to form a nearly-rectangular frame, grooves to be formed may be the oblique ones and the moving direction may be parallel to the longitudinal direction of the grooves to prevent balls or the like from being produced which would decrease the quality, thereby increasing the print speed.

The present invention may also be employed in an apparatus and method for manufacturing a liquid crystal device to prevent, during the dropping and panel-alignment method, liquid crystal from leaking out or air from being trapped in the seal.

The embodiments disclosed herein are by way of example only and are not by way of limitation. The scope of the present invention is set forth in the claims rather than the above description, and includes all the modifications within the spirit and scope equivalent to those defined in the claims.

INDUSTRIAL APPLICABILITY

The present invention is advantageously applicable to flexography requiring transfer of a printing substance with increased thickness. Further, it is advantageously applicable to the step of disposing a seal on the surface of the panel substrate during manufacture of a liquid crystal device.

The invention claimed is:

1. A printing plate comprising a raised part for transferring printing substance to a printing substrate, wherein
said raised part is formed to extend linearly in plan view,
said raised part is shaped as a rectangular frame in plan view,
said raised part has at least one groove formed on its printing surface,
said at least one groove is formed to pass through from one side to another side of said raised part, wherein said groove has a triangular cross section.

2. The printing plate according to claim 1, wherein a plurality of said grooves extend in one direction and parallel to each other and are equally spaced apart.

3. The printing plate according to claim 2, being a printing plate for a flexographic press, wherein
said groove has a width along the panting surface of said raised part of not less than 20 μm and not more than 60 μm, a depth of not less than 25 μm and not more than 75 μm, and a distance between the grooves of not less than 20 μm and not more than 60 μm.

4. The printing plate according to claim 3, said printing plate including said raised part shaped as the rectangular frame, wherein
a side of said frame is parallel to a longitudinal direction of said groove, and
said raised part is provided such that said side of said frame is in a slanting direction relative to a moving direction of said printing plate.

5. The printing plate according to claim 3, said printing plate including said raised part shaped as the rectangular frame, wherein
a side of said frame and a longitudinal direction of said groove form an angle of approximately 45°.

6. The printing plate according to claim 5, wherein a moving direction of said printing plate is substantially perpendicular to the longitudinal direction of said groove.

7. The printing plate according to claim 5, wherein the moving direction of said printing plate is substantially parallel to the longitudinal direction of said groove.

8. A press comprising said printing plate according to claim 1.

9. An apparatus for manufacturing a liquid crystal device comprising said printing plate according to claim 1.

10. A method of relief printing comprising:
the step of printing by pressing, on a printing substrate, a printing plate including a raised part,
said raised part is formed to extend linearly in plan view,
said raised part is shaped as a rectangular frame in plan view,
said raised part having a plurality of grooves on a surface for transferring printing substance,
wherein said raised part is shaped as the rectangular frame, said grooves are linear grooves parallel to each other and equally spaced apart, and the printing substance to be printed onto said printing substrate is a sealing material,
said plurality of grooves passing through from one side to another side of said raised part; and
the step of transferring printing substance to the printing substrate by disposing said printing plate on a perimeter surface of a cylindrical place cylinder and rotating said plate cylinder,
wherein the method of relief printing is performed by using a flexographic press.

11. The printing method according to claim 10, wherein said sealing material is a sealing material for a flat panel display, said grooves have a width along a surface of said raised parts of not less than 20 μm and not more than 60 μm, a depth of not less than 25 μm and not more than 75 μm, and a distance between the grooves of not loss than 20 μm and not more than 60 μm.

12. The printing method according to claim 11, wherein said step of transferring includes the step of rotating said plate cylinder while using said printing plate with said grooves being parallel with a side of said frame, a moving direction of said printing plate forming an angle of approximately 45° with a longitudinal direction of said grooves.

13. The printing method according to claim 11, wherein said step of transferring includes the step of rotating said plate cylinder while using said printing plate with said grooves forming an angle of approximately 45° with a side of said frame, a moving direction of said printing plate being substantially perpendicular to a longitudinal direction of said grooves.

14. The printing method according to claim 11, wherein said step of transferring includes the step of rotating said plate cylinder while using said printing plate with said grooves forming an angle of approximately 45° with a side of said frame, a moving direction of said printing plate being parallel to a longitudinal direction of said grooves.

15. A method of manufacturing a liquid crystal device employing the printing method according to claim 10.

* * * * *